(12) United States Patent
Geiger

(10) Patent No.: US 9,043,169 B2
(45) Date of Patent: May 26, 2015

(54) MONITORING METHOD AND MONITORING DEVICE FOR AN ELECTROSTATIC COATING PLANT

(75) Inventor: Andreas Geiger, Sulz-Bergfelden (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 863 days.

(21) Appl. No.: 13/257,364

(22) PCT Filed: Mar. 2, 2010

(86) PCT No.: PCT/EP2010/001286
§ 371 (c)(1),
(2), (4) Date: Sep. 19, 2011

(87) PCT Pub. No.: WO2010/105738
PCT Pub. Date: Sep. 23, 2010

(65) Prior Publication Data
US 2012/0010832 A1   Jan. 12, 2012

(30) Foreign Application Priority Data
Mar. 17, 2009   (DE) .......................... 10 2009 013 561

(51) Int. Cl.
| | |
|---|---|
| *G01R 21/00* | (2006.01) |
| *B05B 5/10* | (2006.01) |
| *B05B 5/04* | (2006.01) |
| *B05B 13/04* | (2006.01) |
| *H02H 7/00* | (2006.01) |

(52) U.S. Cl.
CPC ................ *B05B 5/10* (2013.01); *B05B 5/0403* (2013.01); *B05B 13/0452* (2013.01); *H02H 7/003* (2013.01)

(58) Field of Classification Search
USPC ........................................ 702/57–60, 64–66
See application file for complete search history.

(56) References Cited

U.S. PATENT DOCUMENTS

| | | | |
|---|---|---|---|
| 4,073,002 A | 2/1978 | Sickles et al. | |
| 4,187,527 A * | 2/1980 | Bentley ......................... | 361/235 |
| 2007/0227445 A1 | 10/2007 | Yamada | |
| 2008/0023198 A1 | 1/2008 | Hsu | |
| 2008/0203198 A1 | 8/2008 | Staats et al. | |

FOREIGN PATENT DOCUMENTS

| | | |
|---|---|---|
| DE | 31812 C | 9/1964 |
| DE | 19903824 A1 | 9/2000 |
| EP | 0185311 A2 | 6/1986 |
| EP | 1250962 A2 | 10/2002 |
| JP | S58-000271 | 1/1983 |
| JP | H05-07803 | 1/1993 |
| JP | H08-266945 | 10/1996 |
| JP | 2001-025688 | 1/2001 |

OTHER PUBLICATIONS

International Search Report PCT/EP2010/001286, dated Mar. 2, 2010.

* cited by examiner

*Primary Examiner* — Mischita Henson
(74) *Attorney, Agent, or Firm* — Bejin Bieneman PLC

(57) ABSTRACT

An electrostatic coating plant coats components with a coating agent that is electrically charged by high voltage device. A first operating variable of a high voltage device may be determined and compared to a limit value. A safety measure may be initiated if the comparison between the first operating variable and the limit value indicates a disturbance in the electrostatic coating plant. The limit value may be flexibly adjusted depending on the operation mode.

18 Claims, 7 Drawing Sheets

MONITORING METHOD AND MONITORING DEVICE FOR AN ELECTROSTATIC COATING PLANT

CROSS-REFERENCES TO RELATED APPLICATIONS

This application is a National Stage application which claims the benefit of International Application No. PCT/EP2010/001286 filed Mar. 2, 2010, which claims priority based on German Application No. 10 2009 013 561.8, filed Mar. 17, 2009, both of which are hereby incorporated by reference in their entirety.

BACKGROUND

The present disclosure relates to a monitoring method and a corresponding monitoring device for an electrostatic coating installation, for example, for coating components with a coating agent which is electrically charged by means of a high voltage device.

The relevant industrial standards (e.g. EN 50176, EN 50348) stipulate that such electrostatic coating installations must comprise monitoring devices, to prevent an impermissible rise in electrical operating current. These monitoring devices continuously check the actual value of an electrical operating variable (e.g. operating current) of the high voltage device against a maximum and/or minimum permissible limit value.

In voltage-controlled operation of the electrostatic coating installation, the operating current is generally compared with a maximum permissible limit value.

If the possible alternative of a current-controlled operation is used for the electrostatic coating installation, on the other hand, the operating voltage is as a rule compared with a minimum permissible limit value for the voltage.

If the measured electrical operating variable exceeds or falls below the specified limit value, depending on the mode of operation (current-controlled or voltage-controlled), the high voltage supply is immediately switched off as a safety measure.

The above-described conventional monitoring method for an electrostatic coating installation operates satisfactorily when processing high resistance varnish paints (>400 kΩ on the Ransburg scale). When coating motor vehicle body components, however, low resistance varnish paints (<300 kΩ on the Ransburg scale) are increasingly used, which often have a high solids content, which holds a certain safety risk since the limit values for the safety thresholds have to be set increasingly higher because the ratio between the coating current flowing via the component to be coated on the one hand and the installation current flowing away via the rest of the coating installation on the other hand is always less favourable due to the low resistance of the varnish paint used.

This problem is further aggravated by fluctuations in the electrical resistance of the varnish paint between different batches or different production series. For instance, the ratio between coating current and installation current was hitherto 10:1, whereas with low resistance varnish paints the ratio of coating current to installation current may be 1:2. Installations even exist in which the coating current amounts to 2 µA and the installation current to 50 µA. Thus, varnish paints with a high solids content exhibit low resistance, for example. Furthermore, solvents and additives make the varnish paint more or less conductive. In addition, special effect particles (e.g. metallic flakes) form a conductive path when the varnish paint is circulating. This results in the fluctuations of the installation current having a significantly more severe effect.

In addition, both the coating current and the installation current are dependent on the coating voltage. This makes itself felt disadvantageously in particular in the case of a large installation current, since if for example coating is carried out at a number of different voltages, the limit value for monitoring has to be set at the highest voltage used. This results in the noise ratio between the normal operating current and the limit value for safety switch-off becoming ever higher, the lower the coating voltages.

A monitoring method is known from DE 199 03 824 A1 in which the limit value is not however adapted as a function of electrical operating variables.

In addition a current limiting circuit is known from DD 31812 A in which the limit value has however to be individually set for each type of coating, the shape of each part to be coated and each degree of wetting. Automatic adaptation of the limit value is thus not known from this document.

This also applies to US 2008/0203198 A1, in which the limit value has likewise to be set as a function of the component to be coated.

Nor is it known from US 2007/0227445 A1 to set the limit value automatically, as a function of electrical operating variables of the coating installation.

Finally, U.S. Pat. No. 4,073,002 does not disclose any limit value adaptation at all. Rather, this document merely provides a current-limiting resistance, which automatically leads to stabilisation.

The object of the present disclosure is therefore to provide an improved monitoring method and an improved monitoring device for an electrostatic coating installation.

It is in particular desirable to avoid the above-described problems of the prior art.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

Figure 1:
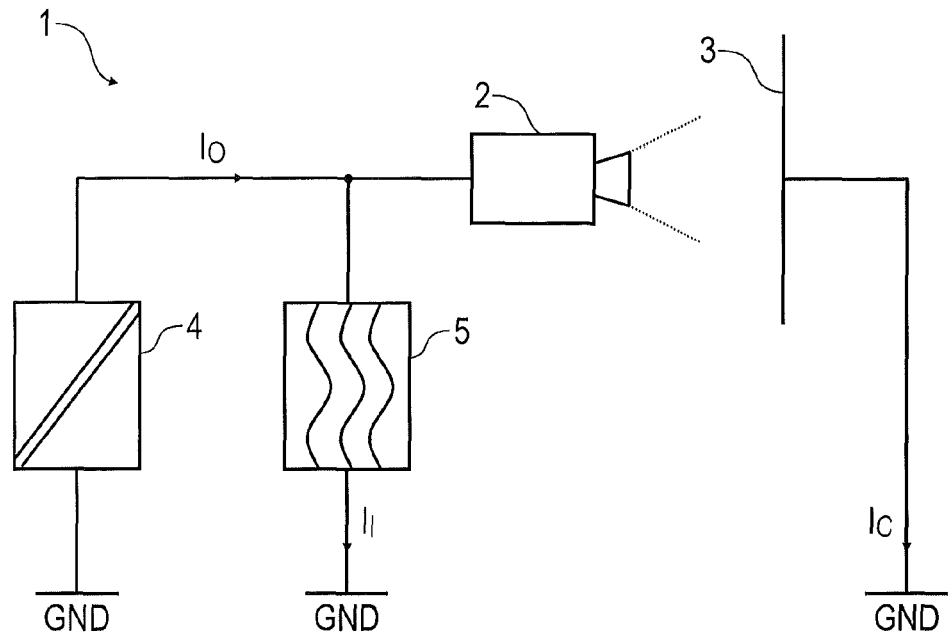
FIG. 1 is a schematic representation of an electrostatic coating installation.

Various exemplary illustrations are provided herein of a monitoring method and a monitoring device.

The exemplary illustrations include the general technical teaching of not rigidly specifying the limit value for checking the safety-relevant electrical operating variable (e.g. operating current or operating voltage) of the electrostatic coating installation, but rather of setting it flexibly as a function of operation, so as to ensure the smallest possible noise ratio. The monitoring function may thus be more finely adapted to the respective operating conditions, whereby the response in the event of a fault is quicker, so also ensuring improved safety.

The term "noise ratio" used for the purposes of the exemplary illustrations may take account of the difference between the instantaneous value of the monitored electrical operating variable (e.g. operating current) and the limit value.

In one exemplary illustration, a target value is specified for the safety-relevant first operating variable (e.g. operating current or operating voltage) or for a second operating variable of the electrostatic coating installation, such that the first operating variable is then open- and/or closed-loop controlled in accordance with the specified target value. The limit value is then fixed as a function of the specified target value. The various limit values may in this case be read out from a stored assignment table as a function of the target value. A disadvantage of reading out the respective limit value from the assignment table is the effort needed to maintain the assignment table, which defines the relationship between the specified target value and the resultant limit value.

In one example, the monitored safety-relevant operating variable is thus identical to the closed-loop controlled operating variable. For example, the operating current of the electrostatic coating installation may form the safety-relevant operating variable, closed-loop control of the operating current also taking place.

In another exemplary illustration, the monitored safety-relevant operating variable is in contrast not identical to the closed-loop controlled operating variable of the electrostatic coating installation. In this example it is thus not the closed-loop controlled operating variable of the electrostatic coating installation which is monitored, but rather another operating variable. For example, the operating voltage of the electrostatic coating installation may be closed-loop controlled, while the operating current is monitored as the safety-relevant operating variable.

Because of the above-described disadvantage of maintaining the assignment table, there is an alternative option of an operator specifying only the highest limit value for the in each case highest target value used, whereupon the limit values are automatically calculated for the different target values, for example in accordance with a specified functional relationship. In this case, the largest target value is thus determined which may arise when the coating installation is in operation. The associated limit value is then set for this largest target value. The limit values for the other target values are then determined automatically as a function of the instantaneous target value and the limit value for the largest target value.

In one exemplary illustration, setting of the limit value for safety monitoring is however fully automated, whereby not only is effort reduced, but also at the same time safety increased, because limit values which are deliberately or unintentionally set too high can no longer occur.

With this exemplary illustration it should be mentioned that the operating current serving to charge the coating agent may generally consist of an "installation current" and a "coating current", the installation current flowing away via the coating installation and not via the component to be coated, while the coating current flows away via the component to be coated and not via the coating installation.

The installation current may be substantially dependent on the output voltage of the high voltage supply and the electrical resistance of the coating agent used and optionally of the flushing agent. At a constant output voltage the installation current is constant during the coating process. In addition the installation current may also depend on the cross-section of the lines, the line length and the number of lines including the return lines.

The coating current, in contrast, is a variable operating variable, which varies within a given range as a function of various parameters (for example applicator-workpiece distance, workpiece geometry etc.).

When monitoring the operating current of the electrostatic coating installation, the limit value may be fixed for safety monitoring as a function of the installation current and/or the coating current. For example, the limit value may be calculated for safety monitoring by adding a specified noise ratio to the ascertained installation current or coating current.

In a further exemplary illustration the limit value for safety monitoring is ascertained automatically, by measuring and temporarily storing actual values of the safety-relevant operating variable (e.g. operating current). The limit value for the instantaneous safety monitoring may then be fixed as a function of at least one previously ascertained and temporarily stored actual value of the safety-relevant operating variable. For example, the instantaneous limit value may be calculated by adding a specified noise ratio to one of the previously ascertained and temporarily stored actual values. In this calculation of the limit value previously measured actual values of the safety-relevant operating variable are thus taken into account. This exemplary illustration has the advantage that no additional sensors are required. The technical principle of this safety monitoring has its basis in the fact that impermissible overcurrents arise very rapidly for example in the event of a spark-over, such that it is ensured through time-delayed tracking of the limit value that safe switch-off takes place despite the variable limit value.

One condition which may apply to any automatic setting of the limit value for safety checks is that the limit value must be variable only within a window specified by the power of the apparatus and/or by statutory regulations. In this way it is ensured that in the case of slow changes to the load resistance (e.g. due to soiling of the coating installation) safe switch-off still occurs before dangerous situations can arise. The exemplary illustrations therefore may also provide for checking to be performed as to whether the limit value is within a specified permissible operating range. If the calculated limit value for safety monitoring is outside the specified permissible operating range, an error flag may be set, so that suitable countermeasures may be taken. Furthermore, the limit value may in this case be set to the nearest maximum or minimum value of the specified permissible operating range.

The above-mentioned permissible operating range for the limit value may be fixed as a function of the instantaneous electrical power of the high voltage device. One exemplary illustration therefore provides for the instantaneous power of the high voltage device to be ascertained, for example by a current and voltage measurement. The above-mentioned permissible operating range for safety monitoring may then be fixed as a function of the instantaneous power of the high voltage device.

The monitored safety-relevant operating variable may advantageously be the electrical current with which the coating agent is charged in the electrostatic coating installation, wherein one of the operating current, the installation current and/or the coating current may be taken into account.

However, it is alternatively also possible for the safety-relevant operating variable monitored to be the voltage with which the high voltage device of the electrostatic coating installation charges the coating agent.

Furthermore, the monitored safety-relevant operating variable may also be a combination of different operating variables (e.g. current and voltage) or may comprise derived variables, such as in particular time derivatives of current and/or voltage.

However, the exemplary illustrations are not restricted in terms of the monitored safety-relevant operating variable of the electrostatic coating installation to specific operating variables which have been mentioned in this description by way of example.

Moreover, it should be mentioned that the exemplary illustrations may be employed in the case of both voltage-controlled operation and current-controlled operation of the electrostatic coating installation.

If the monitoring according to the exemplary illustrations results in the safety-relevant operating variable exceeding or falling below the limit value, a safety measure is initiated. This may for example take the form of an optical or acoustic alarm signal. In one exemplary illustration, however, the safety measure comprises switching off the high voltage device or at least closed- or open-loop downward control of the safety-relevant operating variable, so that it returns to the permissible value range.

It should additionally be mentioned that the exemplary illustrations are not restricted to the above-described monitoring method, but rather also includes a corresponding monitoring device, which performs an exemplary monitoring method. To this end, the exemplary monitoring device initially conventionally comprises a measuring element, for measuring the safety-relevant operating variable (e.g. operating current) of the high voltage device of the electrostatic coating installation.

Furthermore, an exemplary monitoring device may comprise a comparator unit, for comparing the safety-relevant operating variable (e.g. operating current) with a specified limit value.

One exemplary monitoring device additionally may have a safety device for initiating a safety measure (e.g. emergency switch-off) if the comparison between the safety-relevant operating variable and the specified limit value indicates a malfunction of the electrostatic coating installation. This exemplary safety device is distinguished over the prior art in that the limit value is set flexibly as a function of operation, and that this may proceed automatically.

In one exemplary illustration, a monitoring device comprises a closed-loop controller, for closed-loop control of the safety-relevant operating variable or another operating variable in accordance with a specified target value, wherein the safety device fixes the limit value as a function of the specified target value. To this end, an assignment table may be provided, which contains the associated limit values for individual target values.

Finally, the exemplary illustrations also include a complete electrostatic coating installation with a monitoring device as described above.

FIG. 1 shows a schematic representation of an electrostatic coating installation 1 according to one exemplary illustration, which may for example comprise a rotary atomiser 2 as application apparatus, for coating a motor vehicle body component 3. The coating installation 1 is however in principle also suitable for coating other components. It should additionally be mentioned that another electrostatic application apparatus may also be used instead of the rotary atomiser 2.

The applied coating agent may in this case be electrically charged by a high voltage supply 4, whereas the motor vehicle body component 3 to be coated is electrically earthed.

The high voltage supply 4 then outputs an operating current $I_O$, which partially flows away as an installation current $I_I$ via a coating agent supply 5, while another fraction flows away in the form of a coating current $I_C$ via the motor vehicle body component 3 to be coated. The operating current $I_O$ is thus composed of two fractions, namely the installation current $I_I$ and the coating current $I_C$.

The installation current $I_I$ is substantially dependent on the output voltage of the high voltage supply 4 and the electrical resistance of the coating agent used and optionally of the flushing agent. At a constant output voltage the installation current $I_I$ is therefore also constant.

Figure 2:
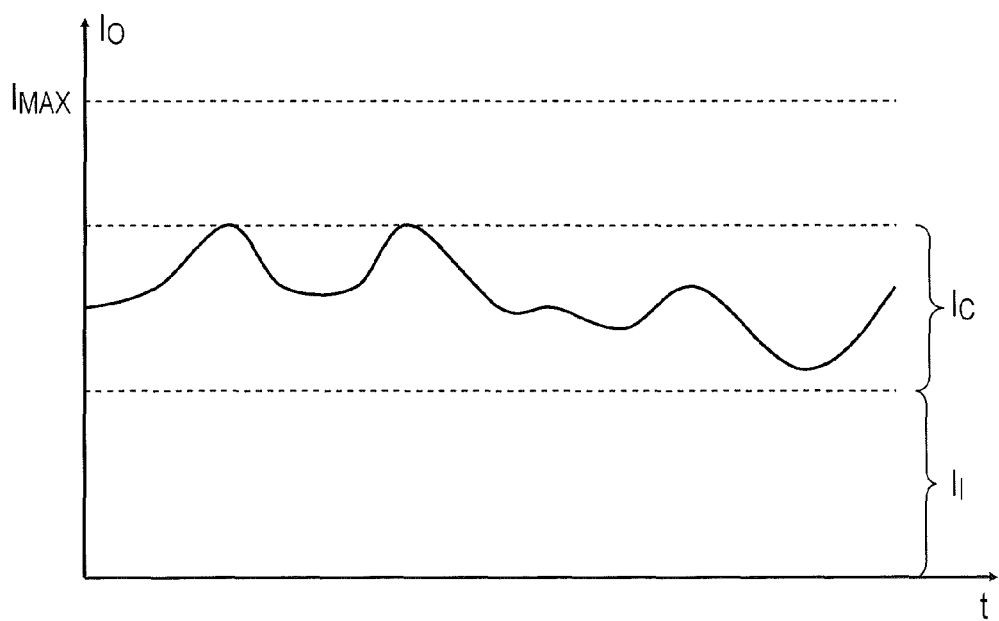
FIG. 2 shows a diagram illustrating the fluctuations over time of the operating current of the electrostatic coating installation.

The coating current $I_C$ is in contrast a variable quantity, which varies within a given range as a function of various parameters (e.g. distance between the rotary atomiser 2 and the motor vehicle body component 3, geometry of the motor vehicle body component 3 etc.), as is also apparent from FIG. 2.

Figure 3:
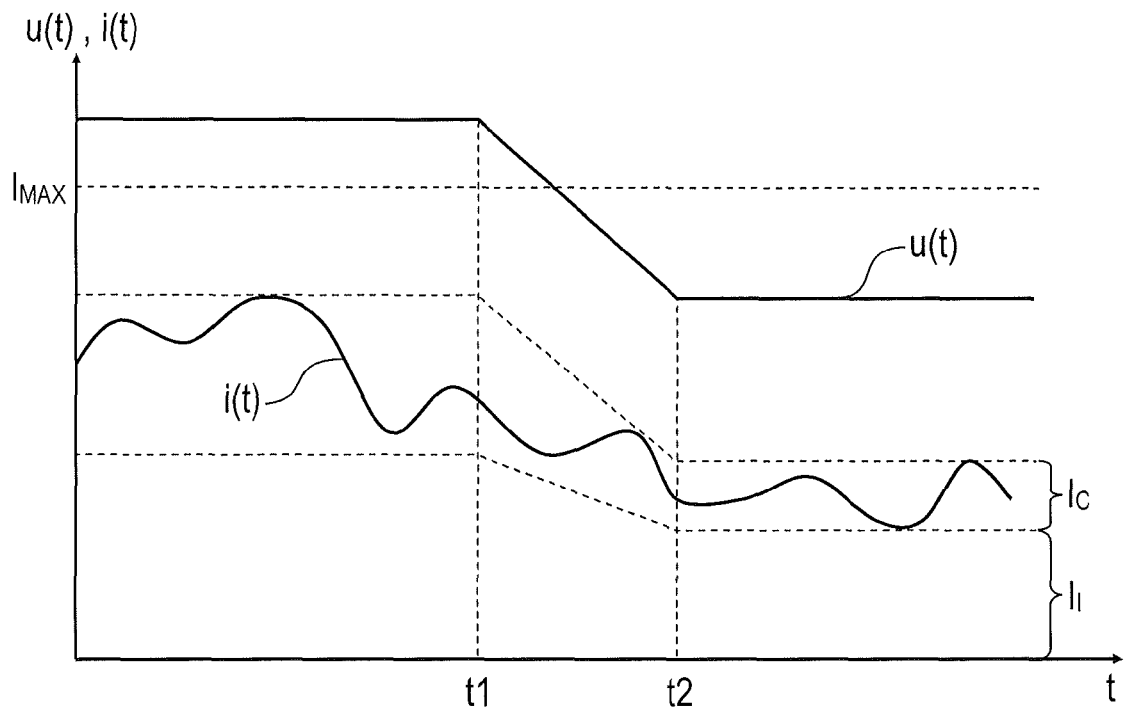
FIG. 3 shows a diagram illustrating the time profile of the operating current and the associated coating current and installation current fractions in the event of a change in the voltage used.

It is additionally apparent from FIG. 3 that a reduction in the output voltage u(t) leads in the period between t=t1 and t=t2 to the occurrence at a lower voltage of a significantly greater noise ratio, whereby the sensitivity of the system for detecting critical states falls. It is therefore necessary to improve the coating installation 1 in such a way that the smallest possible noise ratio is ensured.

Figure 4A:
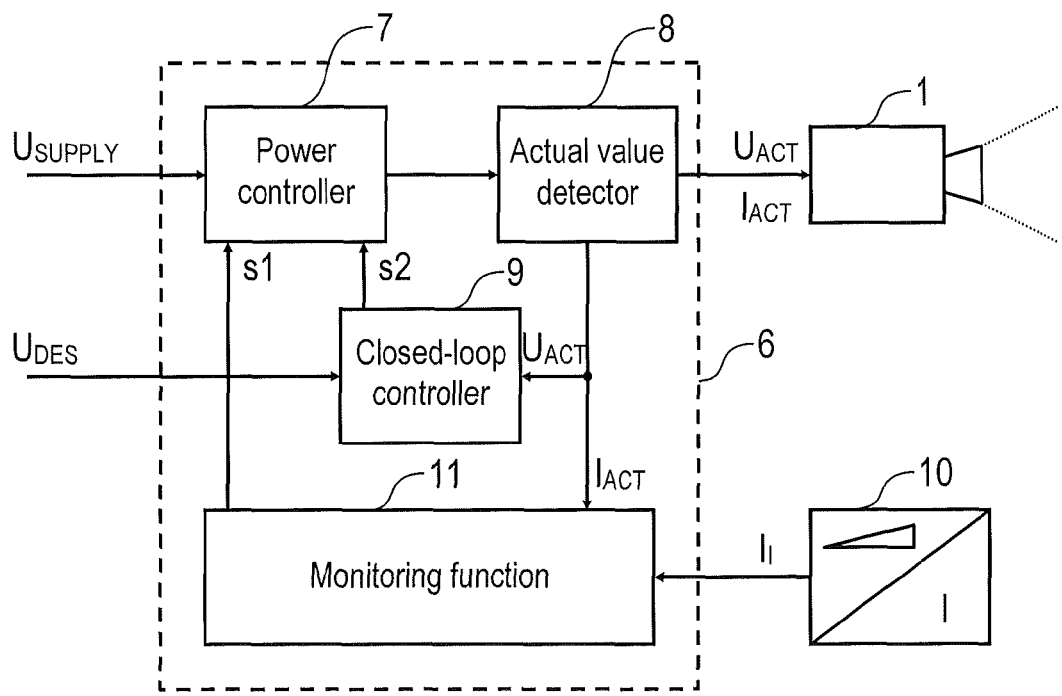
FIG. 4A is a schematic representation of a monitoring device according to one exemplary illustration.

FIG. 4A shows an exemplary illustration of a monitoring device 6 which has the task of carrying out safety monitoring of the operating current $I_O$ to avoid safety-critical operating states.

The monitoring device 6 initially conventionally comprises a power controller 7, an actual value detector 8 and a closed-loop controller 9. The actual value detector 8 ascertains an actual value $I_{ACT}$ of the operating current $I_O$, together with an actual value $U_{ACT}$ and forwards the actual value $U_{ACT}$ to the closed-loop controller 9, which calculates the target/actual value difference from a specified target value $U_{DES}$ and the ascertained actual value $U_{ACT}$ and actuates the power controller 7 with a corresponding control signal s2, such that the actual value $U_{ACT}$ of the operating voltage is adjusted to the specified target value $U_{DES}$ and set in accordance with the operating current $I_O$.

Furthermore, a measuring element 10 is provided which measures the installation current $I_I$ and communicates it to a safety device 11. The safety device 11 may then calculate from the installation current $I_I$ a corresponding limit value $I_{LIMIT}$ and compares this with the actual value $I_{ACT}$ of the operating current $I_O$. If the actual value $I_{ACT}$ of the operating current $I_O$ exceeds the limit value $I_{LIMIT}$ calculated in this way, the safety device 11 generates an actuating signal s1 for actuating the power controller 7, which then either accordingly adjusts the operating current $I_O$ downwards or switches off the system.

Figure 4B:
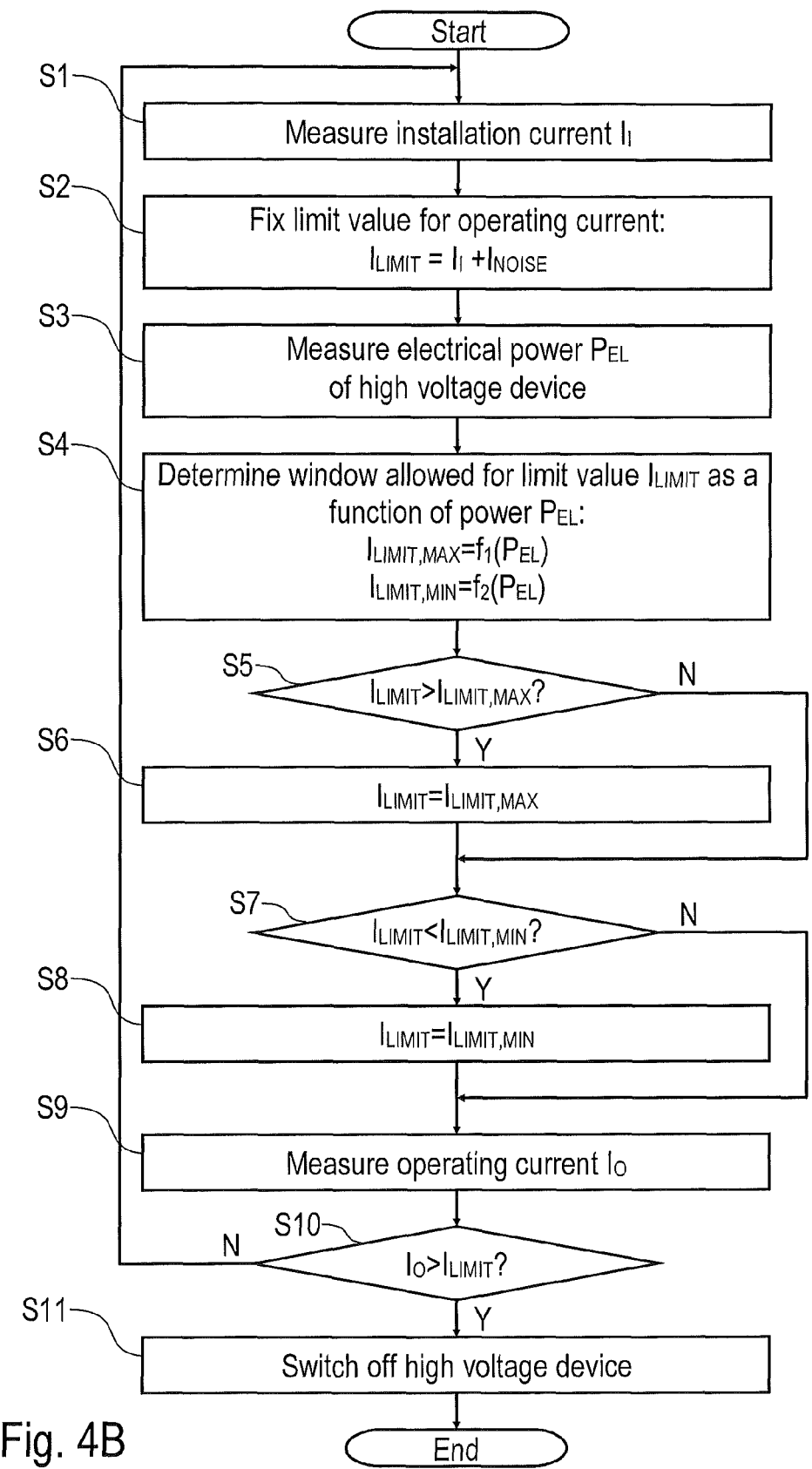
FIG. 4B shows a flow chart which illustrates the monitoring method performed by the monitoring device according to FIG. 4A.

A monitoring method, as performed by the monitoring device 6 according to FIG. 4A, will now be described below with reference to the flow chart in FIG. 4B, according to one exemplary illustration.

An exemplary method may begin at block S1, where the measuring element 10 firstly measures the installation current $I_I$.

Then the safety device 11 may fix the limit value $I_{LIMIT}$ for the operating current $I_O$ as a function of the measured installation current $I_I$ and a specified noise ratio $I_{NOISE}$ as follows:

$$I_{LIMIT} = I_I + I_{NOISE}.$$

The electrical power $P_{EL}$ of the high voltage supply 4 may then be measured, which proceeds at block S3 and is not described in any greater detail for the sake of simplicity.

At a subsequent block S4 a window allowed for the limit value $I_{LIMIT}$ may then be determined as a function of the electrical power $P_{EL}$ of the high voltage supply 4.

At block S5, it may then be checked whether the previously calculated limit value $I_{LIMIT}$ exceeds the maximum permissible limit value $I_{LIMIT,MAX}$.

If this is the case, the limit value $I_{LIMIT}$ may be fixed at block S6 to the maximum permissible limit value $I_{LIMIT,MAX}$.

Otherwise, it may be checked at a further block S7 whether the previously calculated limit value $I_{LIMIT}$ falls below the minimum permissible limit value $I_{LIMIT,MIN}$.

If this is the case, the limit value $I_{LIMIT}$ may be equated at block S8 with the minimum permissible limit value $I_{LIMIT,MIN}$.

The operating current $I_O$ may then be measured at block S9, for which purpose the actual value detector 8 is used.

It may thereupon be checked at block S10 whether the measured operating current $I_O$ exceeds the limit value $I_{LIMIT}$.

If this is the case, the high voltage device 4 may be switched off at block S11, the safety device 11 actuating the power controller 7 accordingly.

Otherwise, the exemplary monitoring method illustrated in FIG. 4B may be performed again in an endless loop.

Figure 5A:
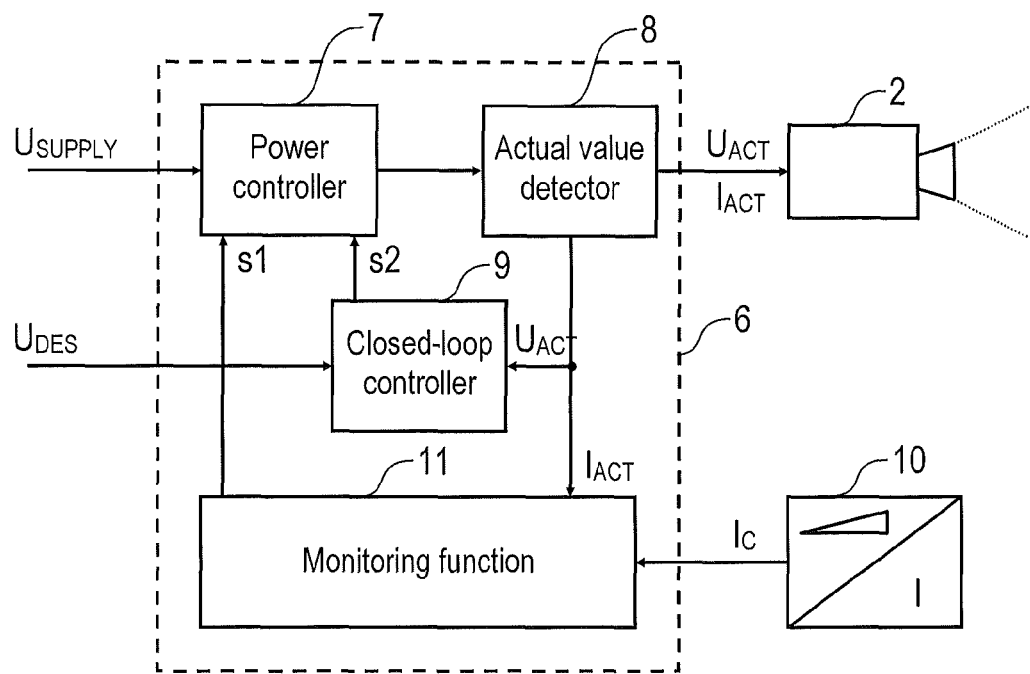
FIG. 5A shows an alternative exemplary illustration of a monitoring device.

The exemplary monitoring device 6 illustrated in FIG. 5A largely corresponds with the monitoring device 6 described above and illustrated in FIG. 4A, such that in order to avoid repetition, reference is made to the above description with the same reference numbers being used for corresponding details.

Figure 5B:
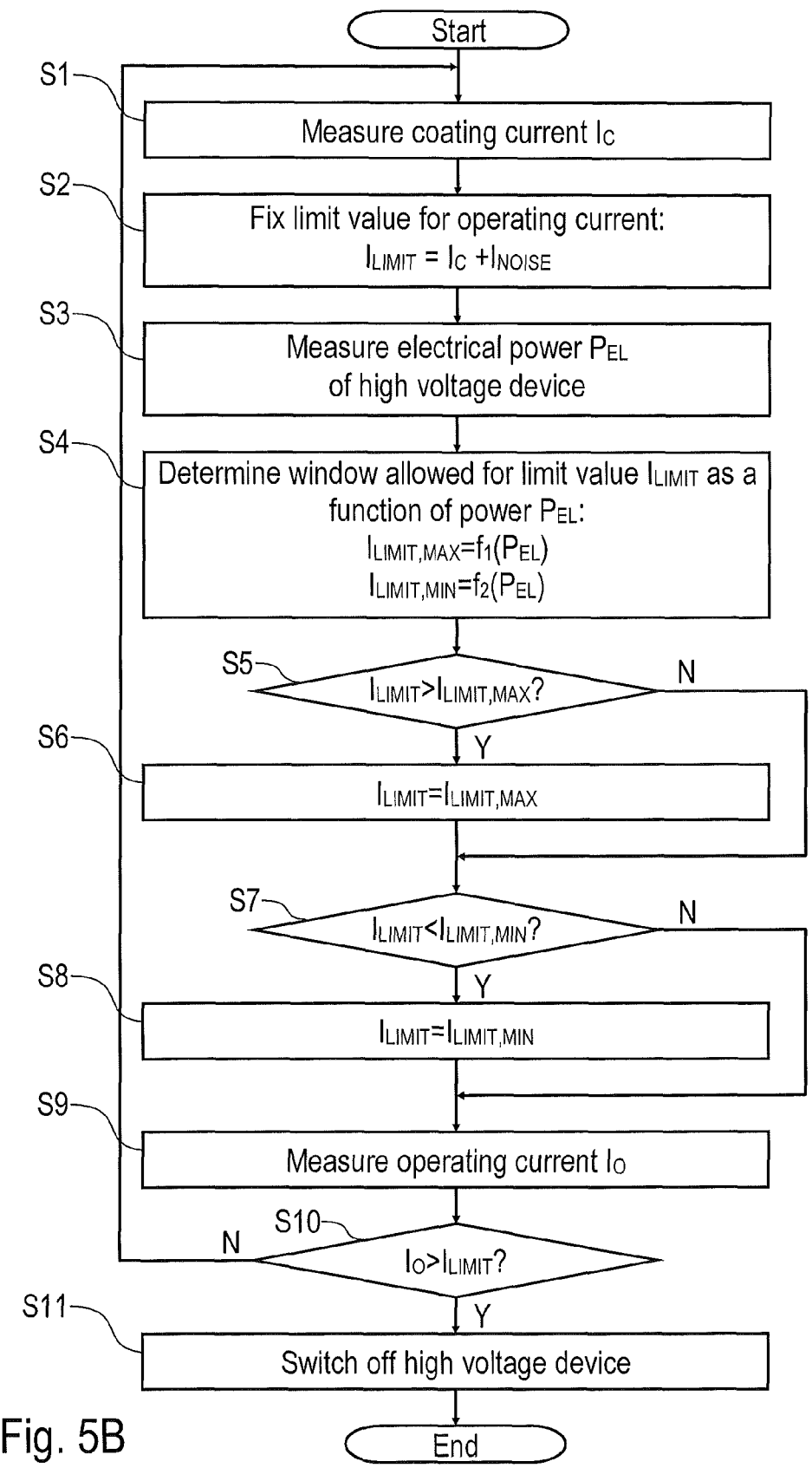
FIG. 5B shows a flow chart which illustrates the monitoring method performed by the monitoring device illustrated in FIG. 5A.

The exemplary illustration of FIG. 5A may have a limit value $I_{LIMIT}$ calculated not as a function of the installation current $I_I$, but rather as a function of the coating current $I_C$. Otherwise this exemplary illustration and also the flow chart according to FIG. 5B correspond with the above exemplary illustration, such that reference is made to the above explanations.

Figure 6A:
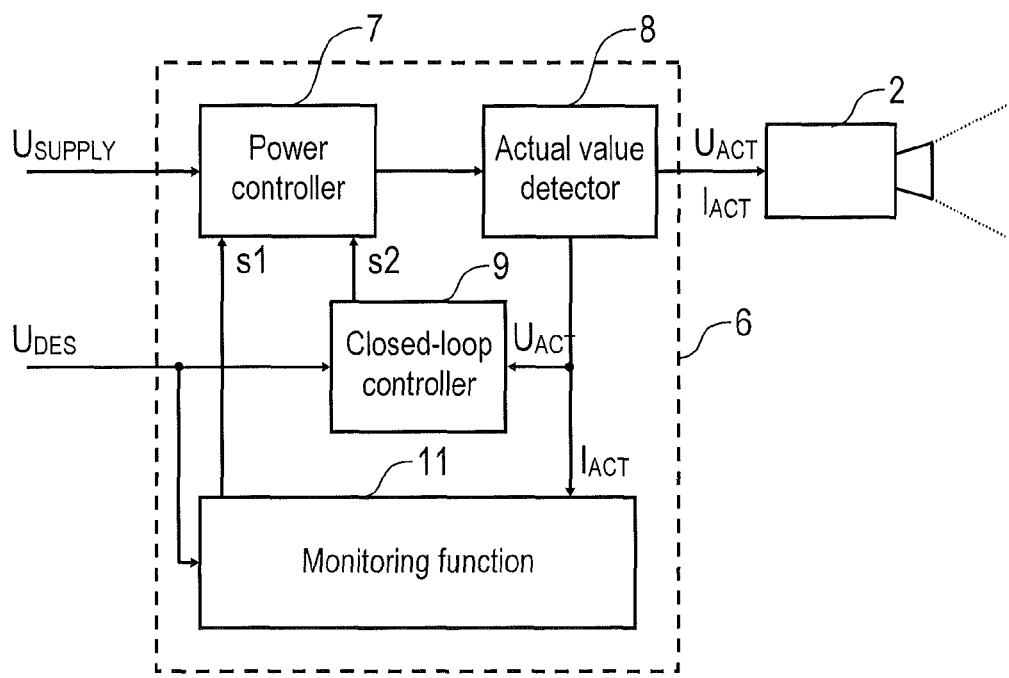
FIG. 6A shows an alternative exemplary illustration of a monitoring device.

The exemplary illustration according to FIG. 6A partially corresponds with the above-described exemplary illustrations, such that to avoid repetition reference is made to the above description with the same reference numbers being used for corresponding details.

Figure 6B:
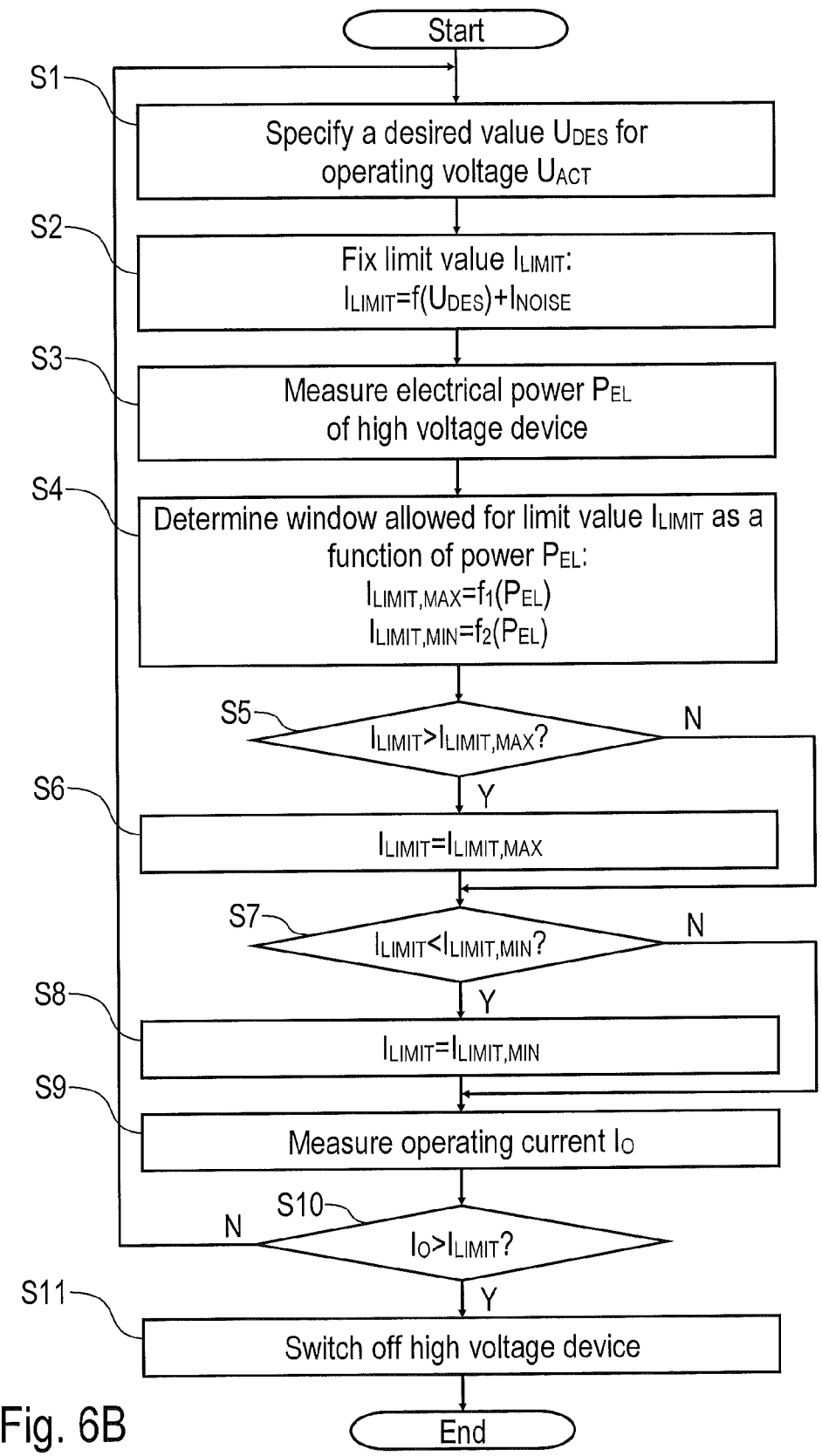
FIG. 6B shows a flow chart which illustrates the monitoring method which is performed by the monitoring device according to FIG. 6A.

A special feature of this exemplary illustration consists in the fact that the measuring element 10 may be dispensed with, since calculation of the limit value $I_{LIMIT}$ proceeds either as a function of the specified target value $U_{DES}$ or the value $I_{DES}$ resulting from the specified target value $U_{DES}$. Accordingly, at block S2 in the flow chart according to FIG. 6B the limit value $I_{LIMIT}$ may be calculated as a function of the specified target value $U_{DES}$ and the specified noise ratio $I_{NOISE}$ as follows:

$$I_{LIMIT} = f(U_{DES}) + I_{NOISE}.$$

Otherwise this exemplary illustration also substantially corresponds with the above exemplary illustrations, such that reference is made to the above description to avoid repetition.

Figure 7:
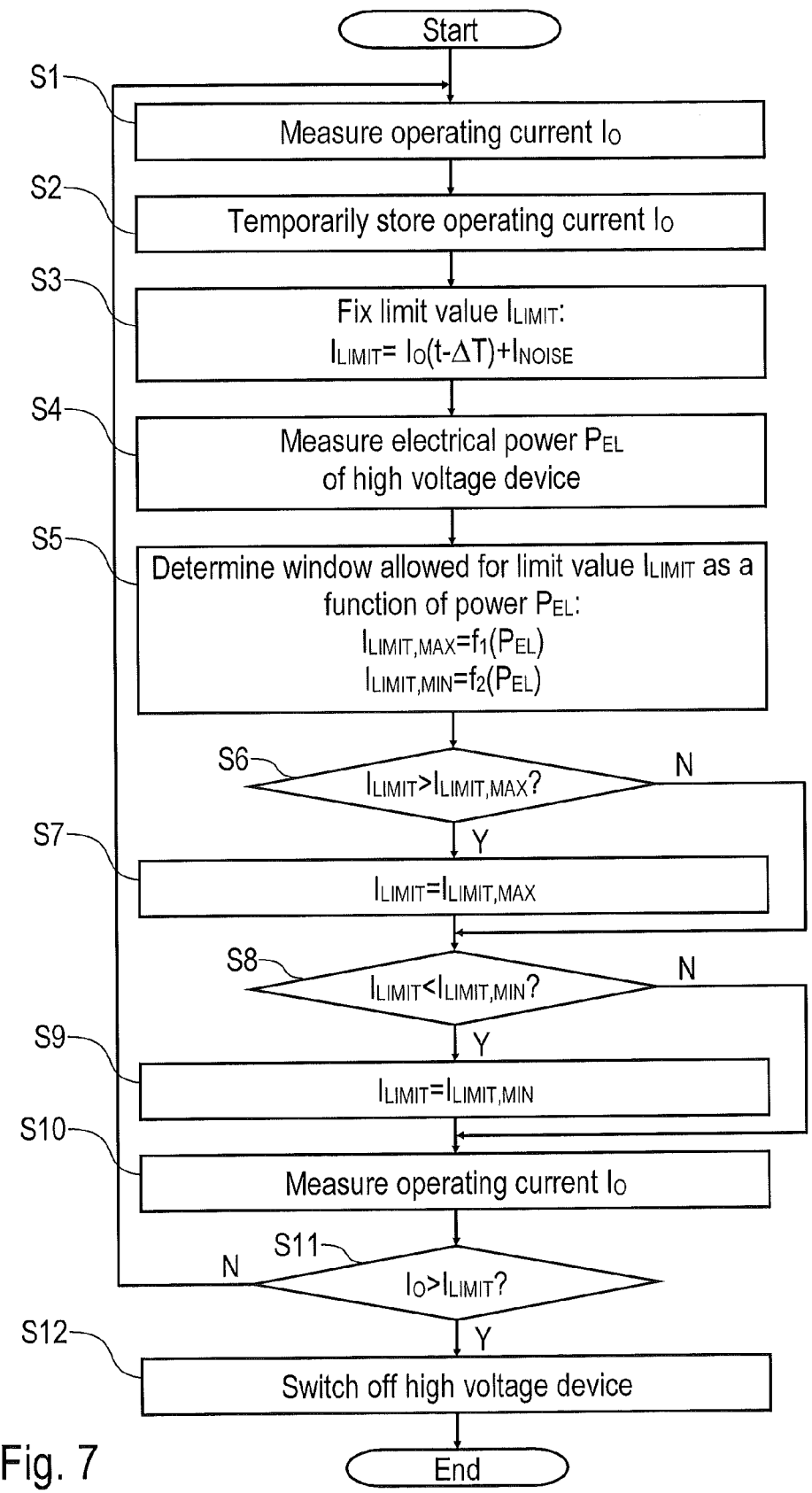
FIG. 7 shows an alternative monitoring method according to an exemplary illustration in the form of a flow chart.

Finally, FIG. 7 shows in the form of a flowchart an alternative exemplary illustration of a monitoring method, which differs from the above-described exemplary illustrations substantially in the calculation of the limit value $I_{LIMIT}$ in steps S2 and S3.

Thus, in this exemplary illustration, when the coating installation 1 is in operation the operating current $I_O$ is measured continuously and stored temporarily. The limit value $I_{LIMIT}$ may then be calculated as a function of a previous operating current $I_O(t-\Delta T)$ and the specified noise ratio $I_{NOISE}$ as follows:

$$I_{LIMIT} = I_O(t-\Delta T) + I_{NOISE}.$$

This exemplary illustration has the advantage that no additional sensors are needed for measuring installation current $I_I$ or coating current $I_C$. This example has its basis in the fact that impermissible overcurrents arise very rapidly for example in the event of a spark-over, such that tracking of the limit value over time ensures that despite the variable limit value safe switch-off may still take place.

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

LIST OF REFERENCE NUMBERS

1 Coating installation
2 Rotary atomiser
3 Motor vehicle body component
4 High voltage supply
5 Coating agent supply
6 Monitoring device
7 Power controller
8 Actual value detector
9 Closed-loop controller
10 Measuring element
11 Safety device
$I_I$ Installation current
$I_O$ Operating current
$I_C$ Coating current

The invention claimed is:

1. A monitoring method for an electrostatic coating installation, which coats components with a coating agent, which is charged electrically by a high voltage device, the monitoring method comprising:
    ascertaining a first operating variable of the high voltage device;
    comparing the first operating variable with a limit value;
    specifying a target value for the first operating variable or a second electrical operating variable of the high voltage device;
    controlling the first or second operating variable in accordance with the specified target value;
    fixing the limit value as a function of the specified target value; and
    initiating a safety measure if the comparison between the first operating variable and the limit value indicates a malfunction of the electrostatic coating installation, the safety measure including at least one of switching off the high voltage device and adjusting the operating variable;
    wherein the limit value is set flexibly as a function of operation.

2. A monitoring method according to claim 1, wherein the limit value is read out from a stored assignment table as a function of the target value.

3. A monitoring method according to claim 1, wherein,
    the largest target value is ascertained which arises when the coating installation is in operation;
    the limit value for the largest target value is set by an operator; and
    the limit values for the other target values are determined automatically as a function of the instantaneous target value and the limit value for the largest target value.

4. A monitoring method according to claim 1 wherein
    the operating current of the electrostatic coating installation serving to charge the coating agent consists of an installation current and a coating current;
    the installation current is a fraction of the operating current which flows away via the coating installation and not via the component to be coated;
    the coating current is a fraction of the operating current which flows away via the component to be coated and not via the coating installation; and
    the first operating variable used for the comparison with the limit value is the operating current of the coating installation.

5. A monitoring method according to claim 4, further comprising:
    determining the limit value, including:
    ascertaining the installation current; and
    fixing the limit value as a function of the ascertained installation current.

6. A monitoring method according to claim 4, further comprising: determining the limit value, including:
    ascertaining the coating current; and
    fixing the limit value as a function of the ascertained coating current.

7. A monitoring method according to claim 5, wherein the limit value is calculated by adding a specified noise ratio to the ascertained installation current or to the ascertained coating current.

8. A monitoring method according to claim 1, further comprising:
    continuously ascertaining an actual value of the first electrical operating variable or a second electrical operating variable of the high voltage device;
    temporarily storing the ascertained actual values; and
    fixing the instantaneous limit value as a function of at least one previously ascertained and temporarily stored actual value.

9. A monitoring method according to claim 8, wherein the instantaneous limit value is ascertained by adding a specified noise ratio to one of the previously ascertained and temporarily stored actual values.

10. A monitoring method according to claim 1, further comprising:
    checking whether the limit value is within a specified permissible operating range;
    setting an error flag if the limit value is outside the specified permissible operating range; and
    setting the limit value to the nearest maximum or minimum value of the specified permissible operating range, if the limit value is outside the specified permissible operating range.

11. A monitoring method according to claim 10, further comprising:
    ascertaining the instantaneous power of the high voltage device; and
    fixing the specified operating range as a function of the instantaneous power of the high voltage device.

12. A monitoring method according to claim 1, wherein the first operating variable is selected from a group consisting of:
    the electrical current with which the coating agent is charged;
    the installation current;
    the coating current of the high voltage device;
    a variable derived therefrom;
    the electrical voltage with which the coating agent is charged; and
    a variable derived therefrom.

13. A monitoring method according to claim 1, wherein the safety measure includes a measure selected from a group consisting of the following measures:
    generating an optical or acoustic alarm signal;
    switching off the high voltage device; and
    reducing the first electrical operating variable of the high voltage device.

14. A monitoring device for a high voltage device for electrical charging of a coating agent in an electrostatic coating installation, comprising:
- a first measuring element for measuring a first operating variable of the high voltage device;
- a comparator unit for comparing the first operating variable with a specified limit value; and
- a safety device for initiating a safety measure if the comparison between the first operating variable and the limit value indicates a malfunction of the electrostatic coating installation, the safety measure including at least one of switching off the high voltage device and adjusting the operating variable;
- wherein the monitoring device is further programmed for:
  - specifying a target value for the first operating variable or a second electrical operating variable of the high voltage device;
  - controlling the first or second operating variable in accordance with the specified target value; and
  - fixing the limit value as a function of the specified target value; further wherein the safety device sets the limit value flexibly as a function of operation.

15. A monitoring device according to claim 14, wherein,
- the operating current of the electrostatic coating installation serving to charge the coating agent consists of an installation current and a coating current;
- the installation current is a fraction of the operating current which flows away via the coating installation and not via the component to be coated;
- the coating current is a fraction of the operating current which flows away via the component to be coated and not via the coating installation;
- a second measuring element is provided for measuring the installation current or the coating current; and
- the safety device sets the limit value as a function of the installation current and/or the coating current.

16. A monitoring device according to claim 14 further comprising a closed-loop controller for closed-loop control of the first operating variable or a second operating variable in accordance with a specified target value the safety device fixing the limit value as a function of the target value.

17. A monitoring device according to claim 14 wherein the monitoring device performs the monitoring method according to claim 1.

18. An electrostatic coating installation with a monitoring device according to claim 14.

* * * * *